United States Patent
Rösseler et al.

(10) Patent No.: US 12,085,140 B2
(45) Date of Patent: Sep. 10, 2024

(54) DAMPING VALVE DEVICE HAVING A PROGRESSIVE DAMPING FORCE CHARACTERISTIC CURVE

(71) Applicant: ZF FRIEDRICHSHAFEN AG, Friedrichshafen (DE)

(72) Inventors: Jörg Rösseler, Ruppichteroth (DE); Aleksandar Knezevic, Eitorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 352 days.

(21) Appl. No.: 17/638,438

(22) PCT Filed: Aug. 24, 2020

(86) PCT No.: PCT/EP2020/073632
§ 371 (c)(1),
(2) Date: Feb. 25, 2022

(87) PCT Pub. No.: WO2021/037798
PCT Pub. Date: Mar. 4, 2021

(65) Prior Publication Data
US 2022/0403910 A1    Dec. 22, 2022

(30) Foreign Application Priority Data

Aug. 29, 2019    (DE) .................... 10 2019 212 966.8

(51) Int. Cl.
*F16F 9/512* (2006.01)
*F16F 9/34* (2006.01)
*F16F 9/348* (2006.01)

(52) U.S. Cl.
CPC .............. *F16F 9/512* (2013.01); *F16F 9/348* (2013.01); *F16F 9/3482* (2013.01);
(Continued)

(58) Field of Classification Search
CPC ........ F16F 9/512; F16F 9/348; F16F 2230/42; F16F 9/5126; F16F 9/3482; F16F 9/3488
(Continued)

(56) References Cited

U.S. PATENT DOCUMENTS

| 4,838,393 | A | * | 6/1989 | Mourray | F16F 9/49 188/284 |
| 5,368,141 | A | * | 11/1994 | Clarke | F16F 9/48 188/282.8 |

(Continued)

FOREIGN PATENT DOCUMENTS

| DE | 102004054474 | 6/2006 |
| DE | 102005046276 | 6/2007 |

(Continued)

OTHER PUBLICATIONS

International Search Report issued in Corresponding PCT Application PCT/EP2020/073632.
(Continued)

*Primary Examiner* — Bradley T King
*Assistant Examiner* — James K Hsiao
(74) *Attorney, Agent, or Firm* — Cozen O'Connor (57) ABSTRACT

A damping valve device for a vibration damper having a piston rod includes a first damping valve which, in a first operating range, moves into an operating position allowing throughflow as the flow velocity of a damping medium increases. A second operating range having a progressive damping force characteristic is influenced by a throttle point in conjunction with a valve body. The valve body is configured as a ring element which has a variable diameter and carries out a radial closing movement in the direction of a flow guiding surface at which a defined minimum throughflow cross-section is maintained, a pressure control valve being hydraulically parallel-connected to the throttle point.

9 Claims, 8 Drawing Sheets

(52) U.S. Cl.
CPC ........... *F16F 9/3488* (2013.01); *F16F 9/5126* (2013.01); *F16F 2230/42* (2013.01)

(58) Field of Classification Search
USPC .................................................... 188/322.15
See application file for complete search history.

(56) References Cited

U.S. PATENT DOCUMENTS

| | | | | |
|---|---|---|---|---|
| 5,788,030 | A | * | 8/1998 | Rottenberger ............ F16F 9/34 188/290 |
| 5,975,258 | A | * | 11/1999 | Nezu ...................... F16F 9/5126 188/266.5 |
| 6,089,142 | A | * | 7/2000 | Adrian .................. F16F 9/3484 92/181 P |
| 2002/0056368 | A1 | * | 5/2002 | May ...................... F04B 53/143 188/322.18 |
| 2006/0108190 | A1 | * | 5/2006 | Forster .................... F16F 9/512 188/318 |
| 2007/0068753 | A1 | * | 3/2007 | Schmidt .................. F16F 9/512 188/316 |
| 2017/0009840 | A1 | * | 1/2017 | Hertz ........................ F16F 9/49 |
| 2021/0108703 | A1 | * | 4/2021 | Rösseler ................ F16F 9/512 |

FOREIGN PATENT DOCUMENTS

| | | |
|---|---|---|
| DE | 102014203598 | 8/2015 |
| DE | 102016210790 | 12/2017 |
| DE | 102017204923 | 9/2018 |
| DE | 10 2018 214 312 | 3/2019 |
| WO | WO 2005/106282 | 11/2005 |
| WO | WO 2018/155339 | 8/2018 |

OTHER PUBLICATIONS

Search Report issued in the corresponding German application No. 10 2019 212 966.8.

* cited by examiner

DAMPING VALVE DEVICE HAVING A PROGRESSIVE DAMPING FORCE CHARACTERISTIC CURVE

CROSS REFERENCE TO RELATED APPLICATIONS

This is a U.S. national stage of International application No. PCT/EP2020/073632, filed on Aug. 24, 2020, which claims priority to German Application No. 10 2019 212 966.8 filed Aug. 29, 2019, the content of each of which is incorporated herein by reference.

BACKGROUND OF THE INVENTION

1. Field of the Invention

The invention relates to a damping valve device having a progressive damping force characteristic curve.

2. Description of the Prior Art

DE 10 2016 210 790 A1 describes a damping valve device for a vibration damper, which comprises a first damping valve, which, in a first operating range, changes over to a throughflow operating position as the speed of flow of a damping medium increases. The first damping valve is formed by a piston valve or a bottom valve of the vibration damper, for example. A second operating range with a progressive damping force characteristic of the vibration damper is influenced by a restriction in conjunction with a valve body which, regardless of the stroke position of a piston rod of the vibration damper, can be moved from a throughflow position to a restricting position as a function of the speed of flow within the restriction, wherein, as the speed of flow of the damping medium increases, the valve body moves in the closing direction. This produces an additional damping force which renders superfluous the use of a conventional tension or compression stop, which is effective only in an end position of the piston rod.

The restriction and the damping valve are arranged hydraulically in series, wherein the valve body is embodied as a ring element of variable diameter, which performs a radial closing movement in the direction of a flow guiding surface, in which a defined minimum passage cross section is maintained.

One fundamental problem of the restriction is that the spacing between the ring element and the flow guiding surface must be kept comparatively small in order to be able to achieve the desired damping effect. On the other hand, full contact between the ring element over its entire circumference with the flow guiding surface would, in the worst case, mean the total failure of the vibration damper. Therefore, the ring element has to be manufactured with high precision, but this results in a considerable manufacturing outlay.

SUMMARY OF THE INVENTION

It is an object of the present invention to solve the problem known from the prior art.

The object may be achieved by the fact that a pressure limiting valve is connected hydraulically in parallel with the restriction.

With the pressure limiting valve, the risk of blocking is eliminated. Consequently, the manufacturing outlay for the restriction can be reduced.

It is obstacles on the roadway which primarily determine the speed of operation of the vibration damper. However, outward deflection movements can also occur at a high speed, and therefore it is advantageous for there to be a pressure limiting valve for both throughflow directions of the restriction.

In another advantageous embodiment, provision can be made for the pressure limiting valve to have an outflow cross section covered by at least one elastic valve disk. By fitting the outflow cross section with valve disks, it is possible to achieve a predetermined damping force characteristic curve. The damping force may increase further, for example, when the pressure limiting valve is open, and may not simply be limited abruptly.

With a view to a configuration of the pressure limiting valve that is as compact as possible, the ring element is arranged in a groove, and this groove forms a component of the pressure limiting valve.

As an alternative, the pressure limiting valve can be arranged in an installation space region of the damping valve device remote from the installation space of the restriction. The proven design of the restriction does not have to be changed.

In a further variant, the ring element forms a component of the pressure limiting valve.

One embodiment of this design principle can be embodied, for example, in such a way that the ring element has at least two volume regions with a different spring rate, wherein the softer volume region forms a valve element of the pressure limiting valve.

The ring element can have an elastic lip which forms the valve body of the pressure limiting valve. In the normal pressure range, the lip performs its sealing or restricting function. However, if the pressure rises above a defined pressure level, the lip can be deformed and the restriction enlarged in the process.

Another configuration is distinguished by the fact that the ring element is arranged in a carrier disk, which has a deformable volume region that determines the outflow cross section of the pressure limiting valve. The carrier disk may consist, for example, of an elastomer material which retains its shape within the usual working range of the restriction. At higher pressures, the carrier disk can then have shielding that leads to the ring element being guided back from the flow guiding surface.

An alternative embodiment of the pressure limiting valve is based on the carrier disk having a deformable volume region which allows the carrier disk to perform a tilting movement. As a result, the ring element is likewise moved away from the flow guiding surface, and the restricting effect of the restriction is thus limited.

Provision can also be made for the carrier disk to be mounted in such a way that it can move axially and, by this, performs an adjusting movement as the valve body of the pressure limiting valve.

BRIEF DESCRIPTION OF THE DRAWINGS

The invention will be explained in greater detail with reference to the following description of the figures, in which.

DETAILED DESCRIPTION OF THE PRESENTLY PREFERRED EMBODIMENTS

Figure 1:
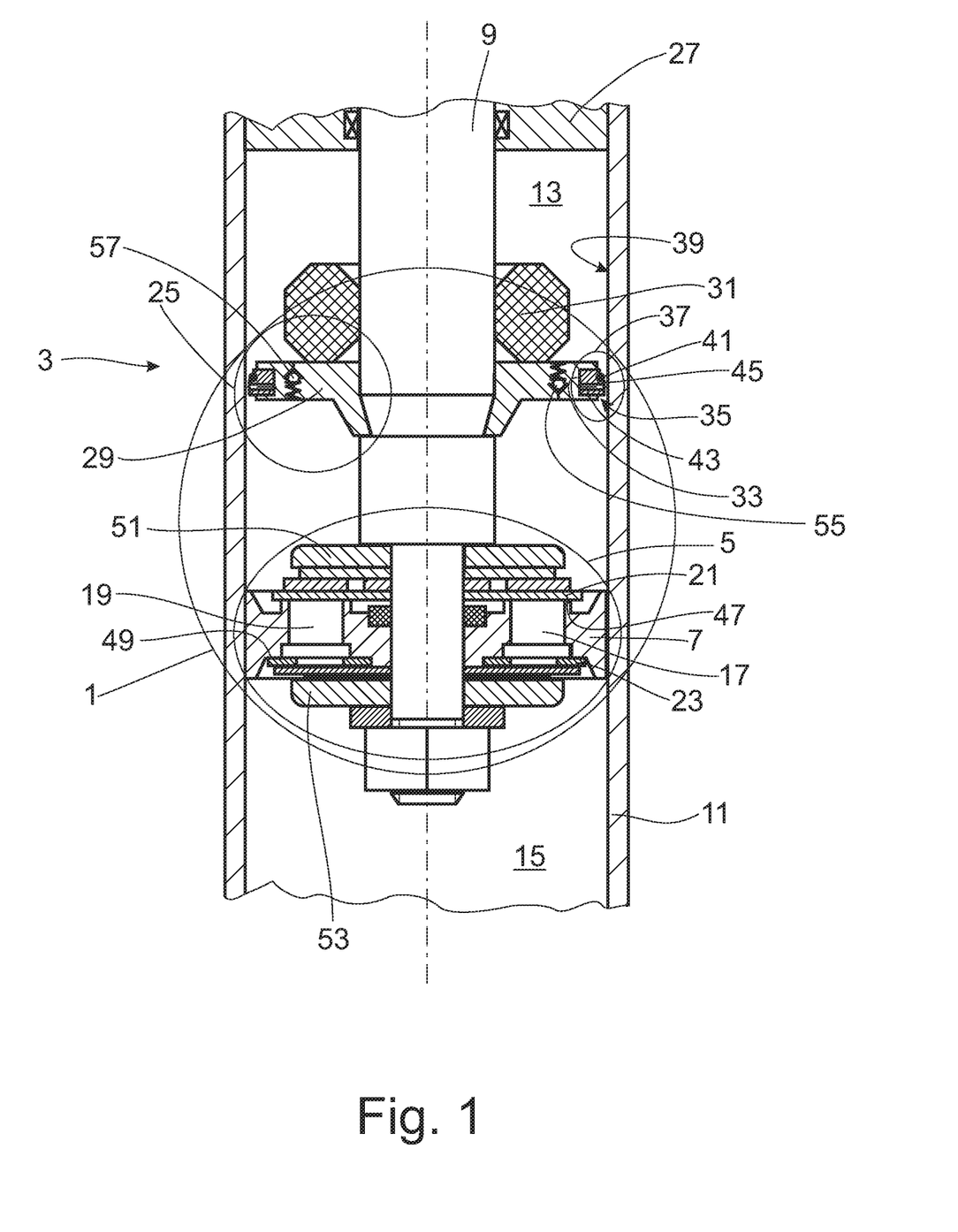
FIG. 1 shows a segment of a vibration damper in the region of the damping valve device.

FIG. 1 shows a damping valve device 1 for a vibration damper 3 of arbitrary construction, illustrated only in part. The damping valve device 1 comprises a first damping valve 5 having a damping valve body embodied as a piston 7, which is secured on a piston rod 9.

The damping valve body 7 divides a cylinder 11 of the vibration damper into a working chamber 13 on the piston-rod side and a working chamber 15 on the side remote from the piston rod, both of the chambers being filled with damping medium. Through channels for respective throughflow directions are formed on different pitch circles in the damping valve body 7. The configuration of the through channels should be regarded as purely illustrative. An outlet side of the through channels 17; 19 is covered at least partially by at least one valve disk 21, 23.

In addition, the vibration damper can have a tension stop 25, which comes to rest against a stop surface of the cylinder, e.g., a piston rod guide 27, from a defined extension movement of the piston rod 9 onward.

The tension stop 25 comprises a carrier disk 29, which is fixed directly on the piston rod by a positive joint. By way of example, an annular elastomer element 31, which is held by a slight radial prestress even in the case of a vibrational movement of the piston rod 9, is placed on an upper side of the tension stop carrier disk 29. Starting from the point of stop contact with the stop surface, the elastomer element 31 acts as an additional supporting spring.

The carrier disk 29 has an encircling groove 33, in which a ring element 35 of variable diameter is guided. This ring element 35 is radially elastic and forms a valve body for a restriction 37 as part of the damping valve device 1. The ring element 35 forms the restriction with an inner wall of the cylinder 11, wherein the inner wall 39 forms a flow guiding surface.

On the outside, the ring element carries a limiting ring 41, e.g., in the form of a retaining ring. Pressure equalization channels 43 are formed radially within the ring element and connect an outer lateral surface 45 of the ring element 35 to the one groove base of the encircling groove 33.

At a piston rod speed in a first operating range, e.g., less than 1 m/s, the restriction 37 is fully open. The damping force is then produced exclusively by the through channels 17; 19 in conjunction with the valve disks 21; 23. When there is a flow toward the valve disks 21; 23, the valve disks 21; 23 rise from their valve seat surface 47; 49. The lifting movement is in each case limited by a supporting disk 51; 53.

In a second operating range with a piston rod speed greater than the limit speed of the first operating range, i.e., greater than the 1 m/s indicated by way of example, the ring element 35 moves into a restricting position and, in the process, performs a closing movement in the direction of the flow guiding surface 39. Owing to the high speed of flow of the damping medium in the restriction 37 shaped as an annular gap, a reduced pressure is formed, leading to radial expansion of the ring element 35. However, to ensure that a blockage of the restriction 37 cannot occur under any circumstances, the defined minimum passage cross section is maintained by the limiting ring 41.

On the one hand, the defined minimum cross section must be comparatively small in order to achieve a restricting effect. On the other hand, manufacturing tolerances occur, e.g., the outside diameter of the ring element 35, the dimensions of the limiting ring 41, which in turn determine the boundary of the ring element 35, or even the inside diameter of the cylinder 11. If all tolerances of the components involved should occur in an unfavorable combination, then the restricting effect in the restriction 37 could be too great and could possibly exert a damaging effect on the vibration damper or on the add-on parts. In order to minimize this risk, a pressure limiting valve 55; 57 is connected hydraulically in parallel with the restriction. In this Figure, the pressure limiting valve 55; 57 is inserted as an equivalent diagram. It should be easily understood that there is a pressure limiting valve 55; 57 for both throughflow directions of the restriction 37 since there is flow through the restriction 37 both during a piston rod retraction movement and during a piston rod extension movement out of the cylinder 11.

Figure 2A:
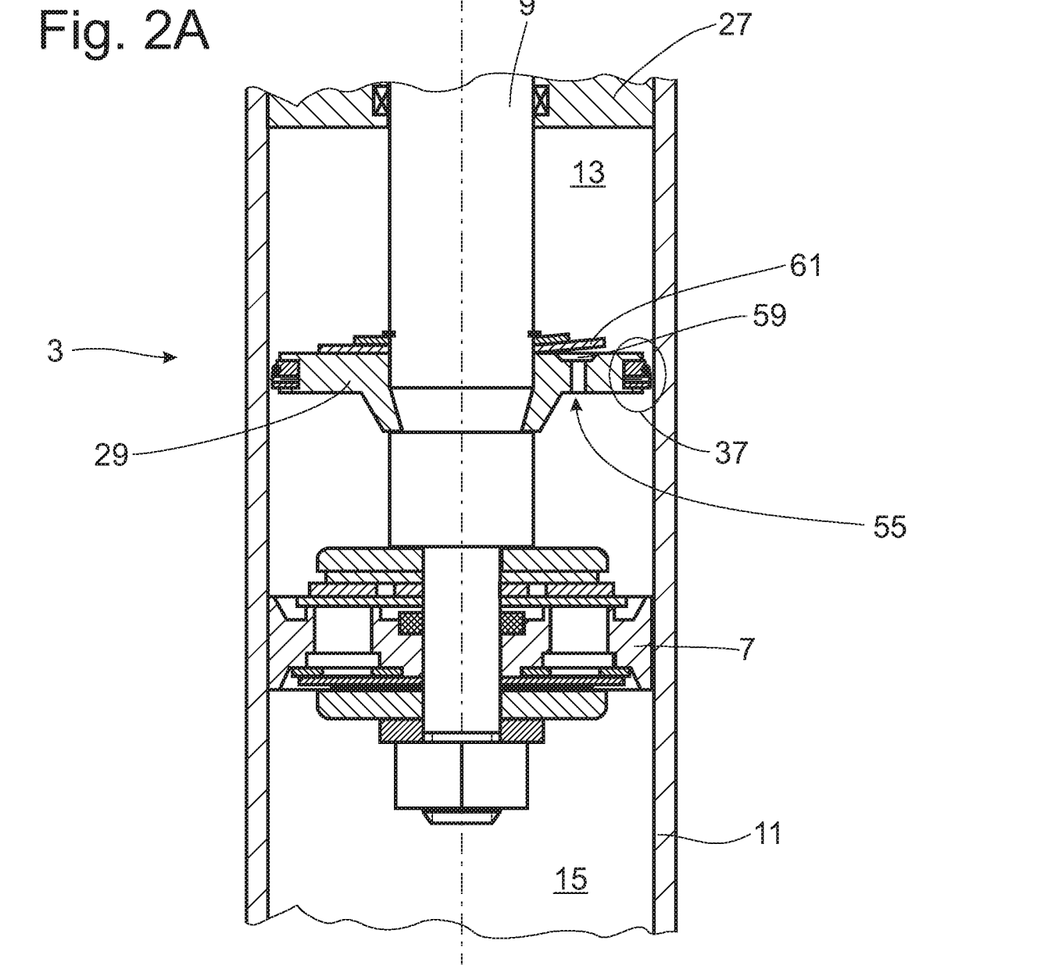
FIGS. 2A and 2B show a pressure limiting valve with valve disks; and a force-speed diagram of the damping valve.

FIG. 2A illustrates by way of example that the pressure limiting valve 55 has an outflow cross section 59 which is covered by at least one elastic valve disk 61. This design can also be configured for two flow directions. The opening behavior of the pressure limiting valve 55 can be configured in accordance with the number, the diameter and the valve disk thickness.

Figure 2B:
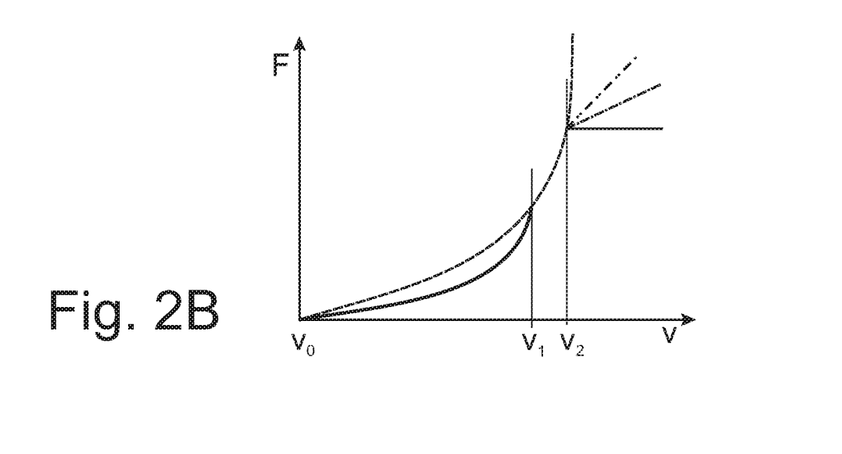

FIG. 2B shows in simplified form a force-speed diagram of the damping valve device 1. Starting from the speed $v_0$, the damping valve 5 has a progressive characteristic curve corresponding to the solid line up to the speed $v_1$. Thereafter, the action of the restriction 37 begins in accordance with the dashed characteristic curve. From the speed $v_2$, the pressure limiting valve 55; 57 opens. If the pressure limiting valve 55; 57 is embodied as an orifice plate, the damping force remains constant even with increasing speed, as the horizontal characteristic curve from $v_2$ is intended to make clear.

However, if the valve disks 61 according to FIG. 2A are used, the characteristic curve can be configured to be more variable beyond the speed $v_2$, as the dash-dotted characteristic curve sections show.

Figure 3:
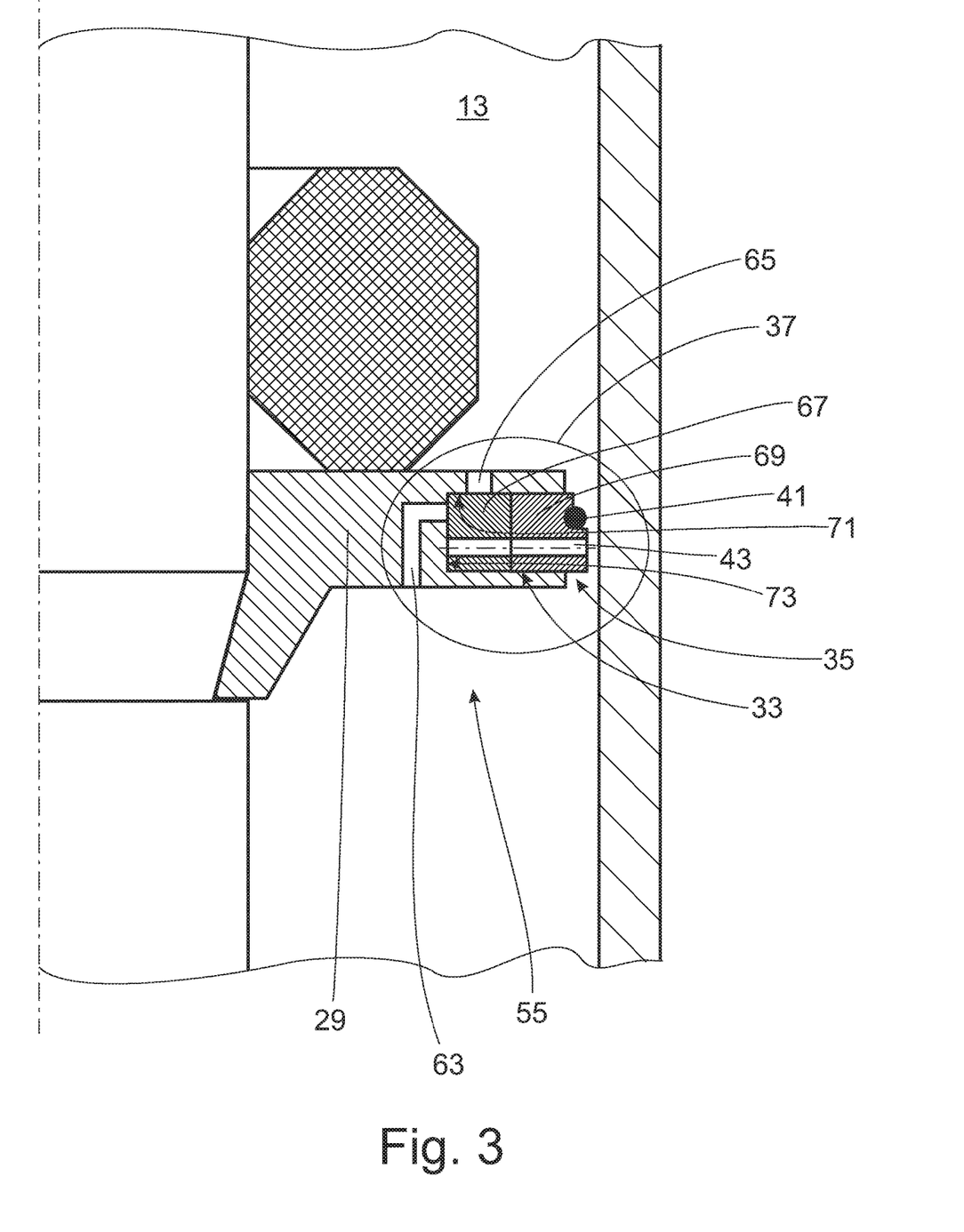
FIGS. 3 and 4 show a pressure limiting valve in a groove of the restriction.

FIG. 3 shows a detail of the damping valve device with a variant of the pressure limiting valve 55, in which the groove 33 for the ring element 35 of the restriction 37 forms a component of the pressure limiting valve. The groove 33 is connected to an inflow channel 63 and an outflow channel 65. By the two channels 63; 65 in conjunction with the groove 33, the working chamber sections would be connected to one another on both sides of the carrier disk 29 of the working chamber 13 on the piston rod side. However, the open connection of the two channels 63; 65 is at least significantly restricted by the ring element 35, and therefore the ring element forms a component of the pressure limiting valve 55.

By way of example, the ring element 35 has at least two volume regions 67; 69 with a different spring rate, which are arranged concentrically to one another and are connected directly to one another. The ring element 35 could be produced by injection molding in a 2-component process, for example. In the speed range up to $v_2$, the radially inner volume component 67 closes the outflow channel 65, which starts in a groove side face 71 of the groove 33. The inflow channel 63 opens into a groove base surface 73 of the groove 33. In the case of a higher compression of the inner volume component 67, which starts from $v_2$, the outflow channel 65 is exposed by the inner volume component 67. As a result, the softer volume region 67 forms a valve element of the pressure limiting valve 55. The outer volume component 69 of the ring element 35 is supported by the limiting ring 41. Therefore, the outer volume component 69 cannot be displaced radially further outward.

If the pressure level decreases again starting from the inflow channel 63, the elastic volume component 67 can reassume its initial position on the groove base surface 73 and close the outflow channel 65 and thus also the pressure limiting valve 55.

Figure 4:
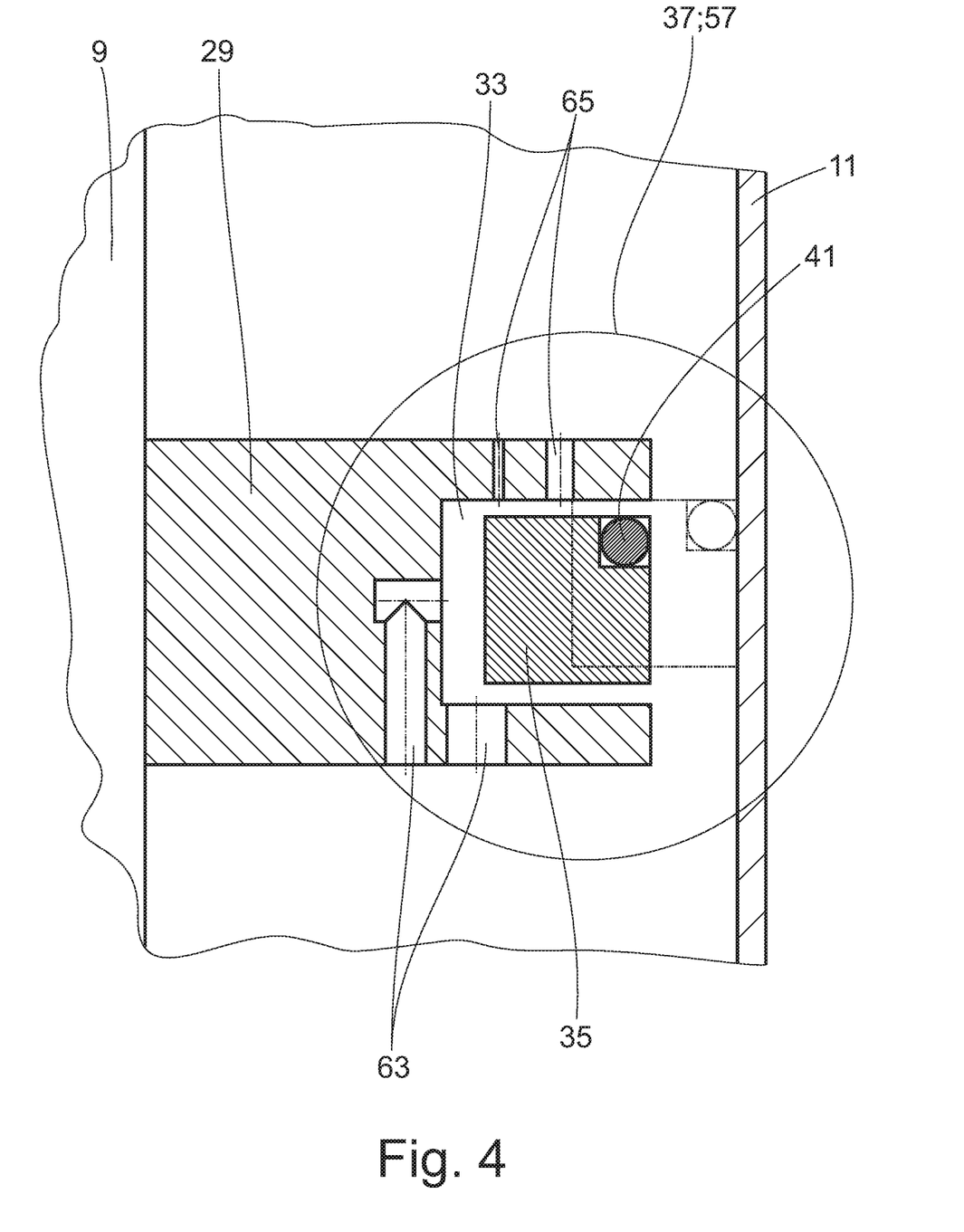

In the embodiment of the restriction 37 according to FIG. 4, two inflow channels 63 and two outflow channels 65 are shown by way of example. Depending on the radial expansion of the ring element 35, more or fewer inflow and outflow channels 63; 65 are effective or are enabled by the ring element 35. The pressure level within the groove 33 can be determined by the effective cross-sectional ratio of the inflow channels 63 to the outflow channels 65. The pressure level, in turn, is decisive for the radial expansion of the ring element and thus for the cross section of the restriction 37. Provision can be made, for example, for the inflow channels 63 to be arranged on different pitch circles and for the cross section of the inflow channels 63 to be smaller on a larger pitch circle diameter than on a smaller pitch circle diameter. On the other hand, the cross sections of the outflow channels 65 can increase with increasing pitch circle diameter. In this way, a governing effect is achieved. The limiting ring ensures the return movement of the ring element 35 in the direction of the groove 33. Consequently, the inflow channels 63, the outflow channels 65, the groove 33, the ring element 35 and the limiting ring 41 form a pressure limiting valve 57.

Figure 5:
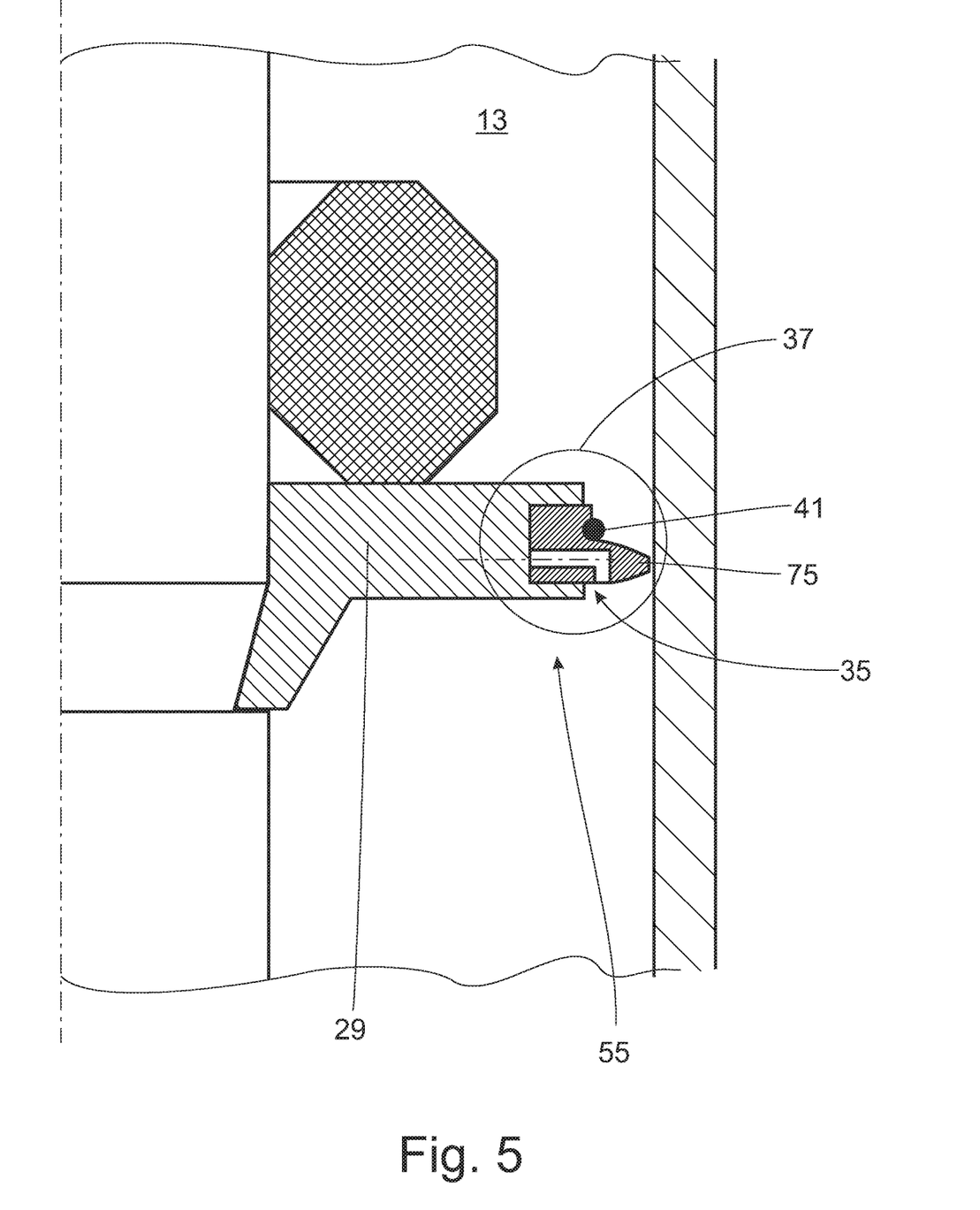
FIG. 5 shows a pressure limiting valve with a sealing lip of the ring element of the restriction.

Another possibility of using the ring element 35 of the restriction 37 as part of the pressure limiting valve 55; 57 is for the ring element 35 to have an elastic lip 75 which forms the valve body of the pressure limiting valve 55; 57. In FIG. 5, this principle is implemented. The idea is that the elastic lip 75 is deformed in the event of too great an axial pressure load, and thus the restriction cross section widens. The limiting ring 41 is arranged radially outside the sealing lip 75, but can form a tilting edge for the sealing lip 75.

Figure 6:
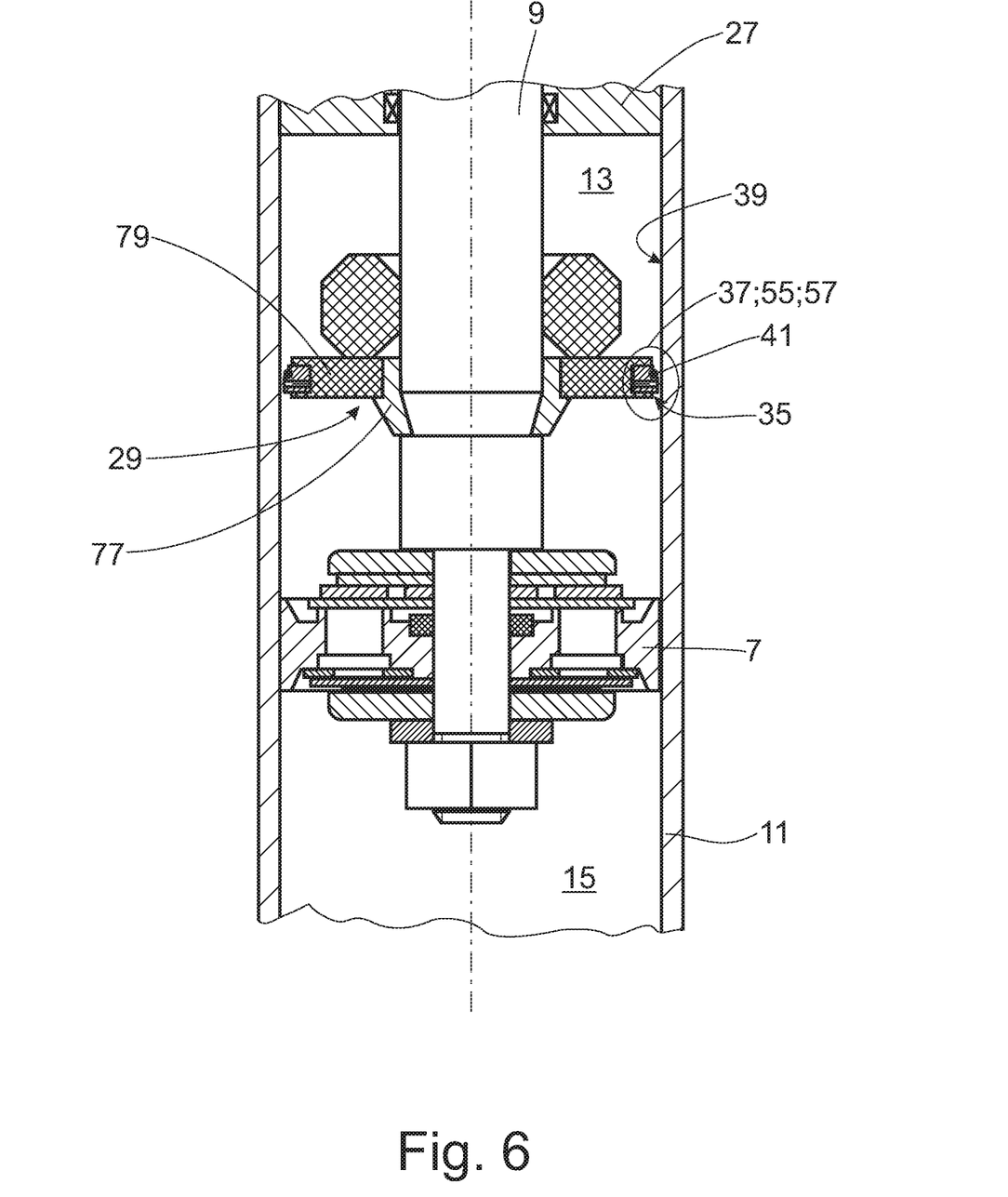
FIGS. 6-8 show a pressure limiting valve with a carrier disk of the restriction as a component of the pressure limiting valve.

In addition to the embodiment according to FIG. 2A, in which the pressure limiting valve 55; 57 is arranged in an installation space region of the damping valve device which is remote from the installation space of the restriction 37, that is to say the ring element 35 or the groove 33 have no relationship to the pressure limiting valve 55; 57, FIG. 6 shows a further possible embodiment in accordance with this specification. In this case, the carrier disk 29 is the essential component for the pressure limiting function.

In FIG. 6, the ring element 35 is arranged in a carrier disk, by which the outflow cross section of the pressure limiting valve 55; 57 is determined. The carrier disk 29 comprises a central carrier sleeve 77, which is connected positively to the piston rod 9. Radially on the outside, the carrier sleeve 77 is fixedly connected to a disk body 79, which is elastically deformable within limits in the axial direction, being composed of a plastic, for example. In the case of a correspondingly high pressurization, which occurs above $v_2$, the disk body 79 shields itself and thus reduces its outside diameter. Consequently, the restricting gap between the ring element 35 and the inner wall 39 of the cylinder 11 also increases in size. The restriction 37 thus regulates itself, i.e., the restriction 37 simultaneously forms the pressure limiting valves 55; 57.

Figure 7A:
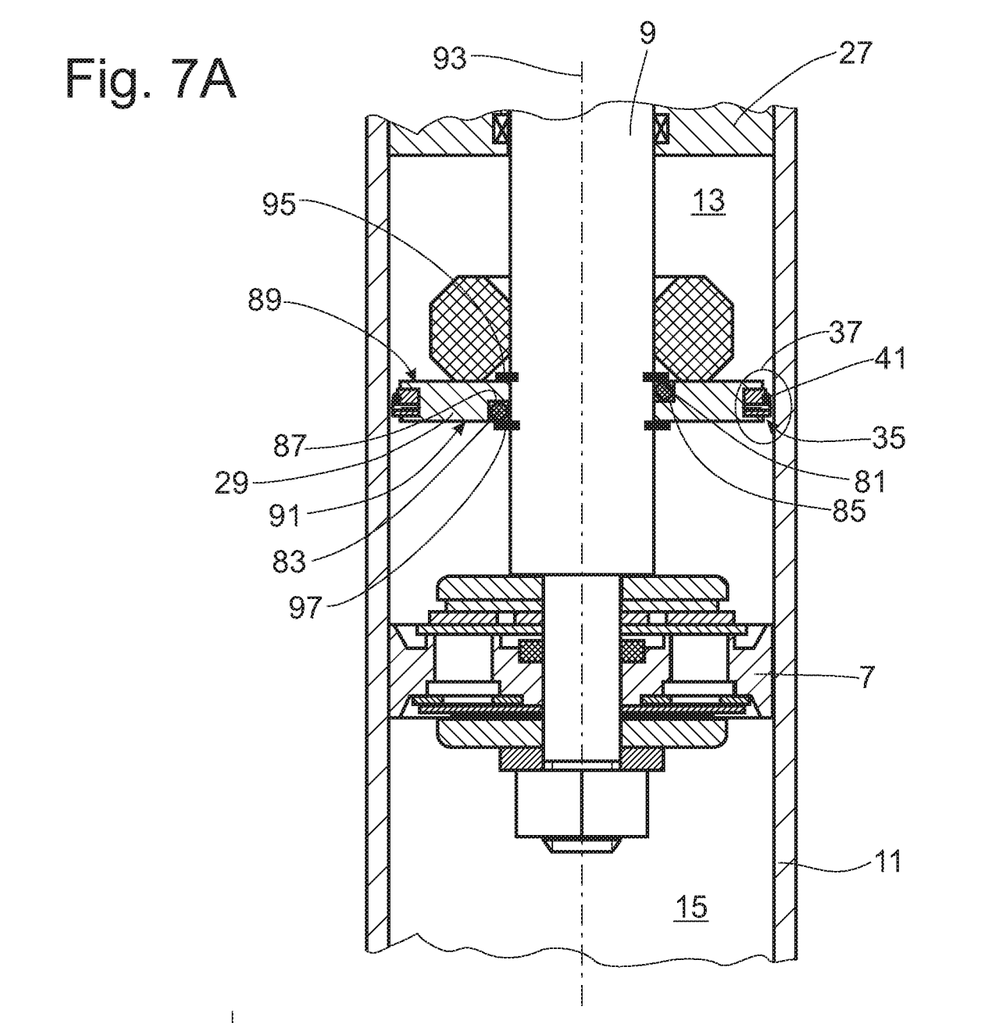
Figure 7B:
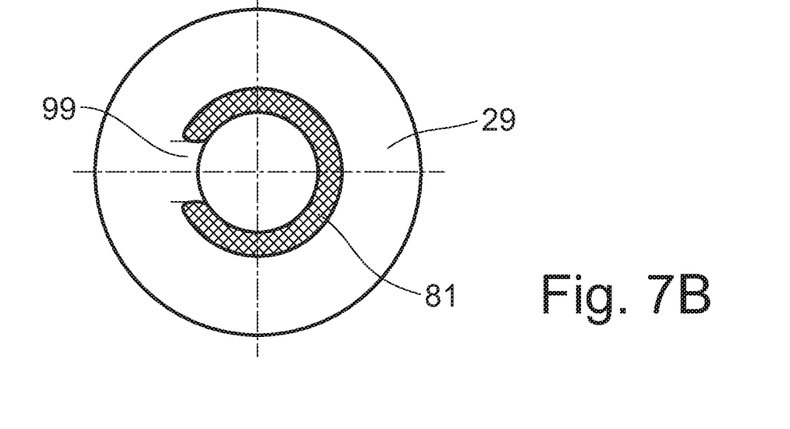

In the embodiment according to FIGS. 7A and 7B, the carrier disk 29 has a rigid main body, which is preferably formed by a metal disk. The carrier disk 29 has a deformable volume region 81; 83 which allows the carrier disk 29 to perform a tilting movement. For this purpose, the deformable volume region 81; 83 is designed, for example, as a c-shaped elastomer body which is accommodated in a corresponding groove 85; 87 on an outer side 89; 91 of the carrier disk 29. A second deformable c-shaped elastomer body 83 is accommodated on an opposite outer side 91 of the piston rod, point-symmetrically with respect to the longitudinal axis 93 of the piston rod. By way of example, two retaining rings 95; 97 provide for the axial support of the carrier disk 29. The outside diameter of the retaining rings 95, 97 is smaller than the respective outside diameter of the elastomer bodies 81, 83. Consequently, the carrier disk 29 can perform a tilting movement. Owing to a remaining residual web 99 between the ends of the elastomer bodies 81; 83, an axial movement of the carrier disk 29 is excluded. The residual web 99 in conjunction with the respective retaining ring 95; 97 determines the tilting point of the carrier disk 29.

Figure 8:
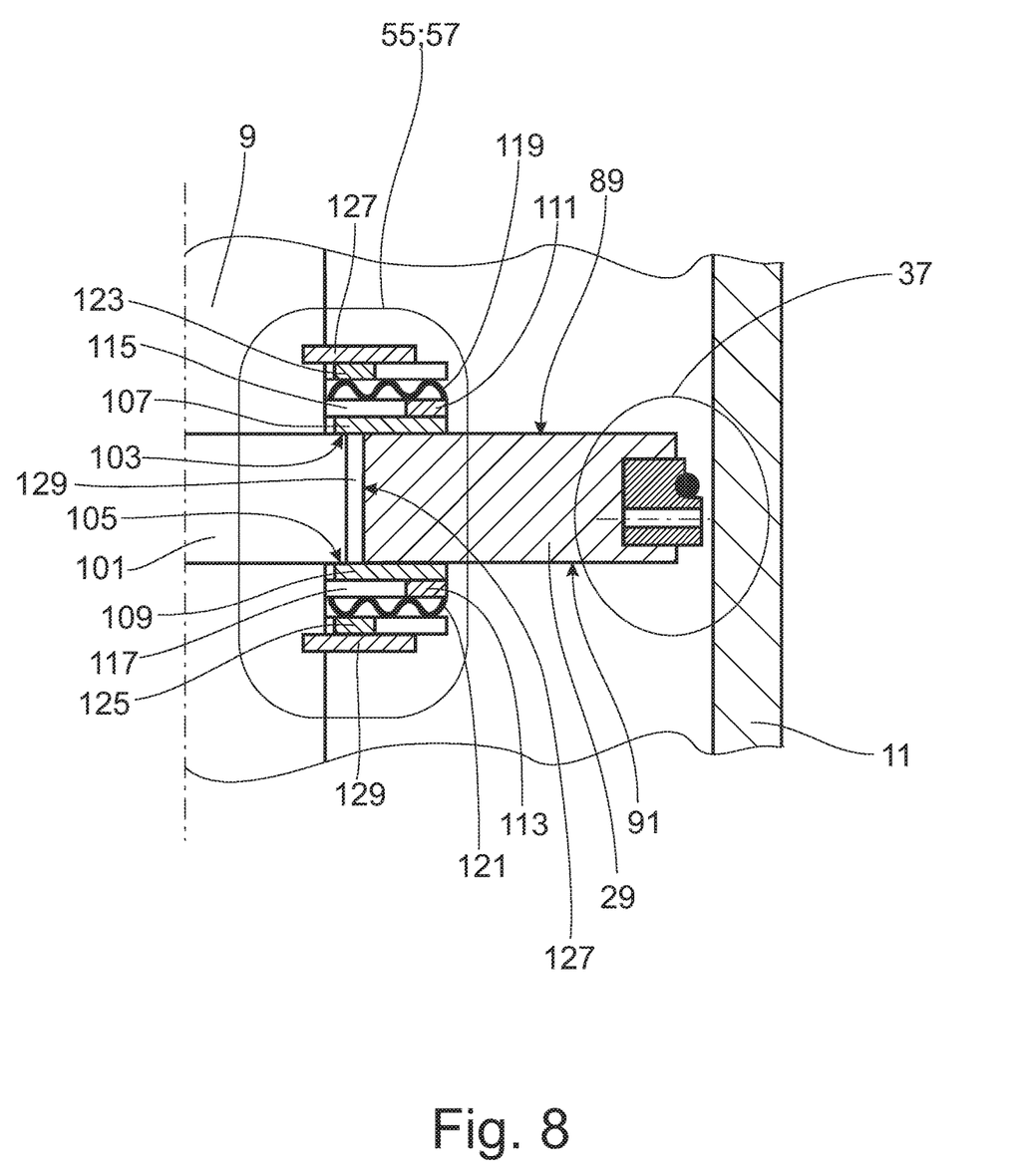

The embodiment according to FIG. 8 is intended to show that the carrier disk 29 can be mounted in such a way that it can move axially and, by in this manner, performs an adjusting movement as the valve body of the pressure limiting valve 55; 57. For this purpose, the piston rod 9 is provided, by way of example, with an annular diameter widening 101, which has two opposite valve seat surfaces 103; 105. Within the manufacturing tolerances, the axial length of the diameter widening 101 corresponds to the material thickness of the carrier disk 29. Arranged on both sides of the valve seat surfaces 103; 105 is a valve disk 107; 109, which is in radial overlap with the valve seat surface 103; 105 and with the associated outer side 89; 91 of the carrier disk 29. The valve disks are centered radially on the piston rod 9 by radial webs. Respective cover disks 111; 113 are placed on the valve disks 103; 105, the cover disks likewise having radially inward-pointing webs, the spaces between which form a flow cross section 115; 117. A spring element 119; 121, preferably a cup spring or a corrugated spring, is arranged on the cover disk 111; 113. This is followed by a cover disk 123; 125, which, starting from an inner ring, has webs which point radially outward. This cover disk 123; 125 is supported axially on a retaining ring 127; 129. The cover disks as a whole serve to form a defined flow cross section. It is also possible to achieve this function by the shape of the spring element 119; 121.

In the case of a flow against the carrier disk 29 below $v_2$, the carrier disk 29 maintains the axial position shown with respect to the piston rod 9 and thus with respect to the valve seat surfaces 103; 105. If the incident flow exceeds the speed $v_2$, the carrier disk 29 is moved together with, for example, the valve disk 107 against the force of the spring element 119. During this process, the valve disk 107 lifts off from the valve seat surface 103. The valve disk 109 on the opposite valve seat surface 105 maintains its instantaneous position. As a result, an annular gap forms between the valve disk 109 and the outer side 91 of the carrier disk. There is an axial channel 129 between the diameter widening 101 and a guide 127 of the carrier disk 29, and therefore a connection is opened between the working chamber regions on both sides of the carrier disk 29.

If the incident flow returns to a level of less than $v_2$, then the more strongly prestressed spring element 119 presses the carrier disk 29 and the valve disk 107 lifted off from the valve seat surface 103 back into the illustrated initial position.

When there is a flow against the outer side 89, the valve disk 109 lifts off from the valve seat surface 105 and an annular gap forms on the same side between the outer side 89 and the valve disk 107 held on the valve seat surface 103. The pressure limiting valves 55; 57 are thus implemented for both incident flow directions of the carrier disk.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

| Reference signs | |
|---|---|
| 1 | damping valve device |
| 3 | vibration damper |
| 5 | first damping valve |
| 7 | damping valve body |
| 9 | piston rod |
| 11 | cylinder |
| 13 | working chamber on the piston-rod side |
| 15 | working chamber remote from the piston rod |
| 17 | through channels |
| 19 | through channels |
| 21 | valve disk |
| 23 | valve disk |
| 25 | tension stop |
| 27 | piston rod guide |
| 29 | carrier disk |
| 31 | elastomer element |
| 33 | groove |
| 35 | ring element |
| 37 | restriction |
| 39 | inner wall |
| 41 | limiting ring |
| 43 | pressure equalization channel |
| 45 | outer surface |
| 47 | valve seat surface |
| 49 | valve seat surface |
| 51 | supporting disk |
| 53 | supporting disk |
| 55 | pressure limiting valve |
| 57 | pressure limiting valve |
| 59 | outflow cross section |
| 61 | valve disk |
| 63 | inflow channel |
| 65 | outflow channel |
| 67 | volume region |
| 69 | volume region |
| 71 | groove side face |
| 73 | groove base surface |
| 75 | lip |
| 77 | carrier sleeve |
| 79 | disk body |
| 81 | volume region |
| 83 | volume region |
| 85 | groove |
| 87 | groove |
| 89 | outer side |
| 91 | outer side |
| 93 | longitudinal axis |
| 95 | retaining ring |
| 97 | retaining ring |
| 99 | residual web |

| Reference signs | |
|---|---|
| 101 | diameter widening |
| 103 | valve seat surface |
| 105 | valve seat surface |
| 107 | valve disk |
| 109 | valve disk |
| 111 | cover disk |
| 113 | cover disk |
| 115 | flow cross section |
| 117 | flow cross section |
| 119 | spring element |
| 121 | spring element |
| 123 | cover disk |
| 125 | cover disk |
| 127 | guide |
| 129 | axial channel |

The invention claimed is:

1. A damping valve device (1) for a vibration damper (3) having a piston rod (9), the damping valve device (1) comprising:
a first damping valve (5) which, in a first operating range, is configured to change over to a throughflow operating position as a speed of flow of a damping medium increases, wherein a second operating range having a progressive damping force characteristic curve is influenced by a restriction (37) in conjunction with a valve body (35) which, regardless of a stroke position of the piston rod (9) within the vibration damper (3), is movable from a throughflow position to a restricting position as a function of the speed of flow within the restriction (37),
wherein, as the speed of flow of the damping medium increases, the valve body (35) is configured to be movable in a closing direction and is arranged hydraulically in series with the damping valve (5),
wherein the valve body (35) is configured as a ring element of variable diameter, which performs a radial closing movement towards a flow guiding surface (39), in which a defined minimum passage cross section is maintained, wherein a pressure limiting valve (55; 57) is connected hydraulically in parallel with the restriction (39); and
a pressure limiting valve (55; 57) for both of two throughflow directions of the restriction (37),
wherein the ring element (35) is arranged in a groove (33), and this groove (33) forms a component of the pressure limiting valve (55; 57).

2. The damping valve device as claimed in claim 1, wherein the pressure limiting valve (55; 57) has an outflow cross section (59) which is covered by at least one elastic valve disk (61).

3. The damping valve device as claimed in claim 1, wherein the pressure limiting valve (55; 57) is arranged in an installation space region of the damping valve device (1) which is distal an installation space of the restriction (37).

4. The damping valve device as claimed in claim 3, wherein the ring element (35) is arranged in a carrier disk (29), wherein the carrier disk (29) has a deformable volume region (79) which determines an outflow cross section of the pressure limiting valve (55; 57).

5. The damping valve device as claimed in claim 4, wherein the carrier disk (29) has a deformable volume region (81; 83) which allows the carrier disk (29) to perform a tilting movement.

6. The damping valve device as claimed in claim 4, wherein the carrier disk (29) is mounted such that it can move axially and, in this manner, performs an adjusting movement as the valve body of the pressure limiting valve (55; 57).

7. A damping valve device for a vibration damper (3) having a piston rod (9), the damping valve device (1) comprising:
a first damping valve (5) which, in a first operating range, is configured to change over to a throughflow operating position as a speed of flow of a damping medium increases, wherein a second operating range having a progressive damping force characteristic curve is influenced by a restriction (37) in conjunction with a valve body (35) which, regardless of a stroke position of the piston rod (9) within the vibration damper (3), is movable from a throughflow position to a restricting position as a function of the speed of flow within the restriction (37),
wherein, as the speed of flow of the damping medium increases, the valve body (35) is configured to be movable in a closing direction and is arranged hydraulically in series with the damping valve (5),
wherein the valve body (35) is configured as a ring element of variable diameter, which performs a radial closing movement in the direction of a flow guiding surface (39), in which a defined minimum passage cross section is maintained, wherein a pressure limiting valve (55; 57) is connected hydraulically in parallel with the restriction (39); and
a pressure limiting valve (55; 57) for both of two throughflow directions of the restriction (37),
wherein the ring element (35) forms a component of the pressure limiting valve (55; 57).

8. The damping valve device as claimed in claim 7, wherein the ring element (35) has at least two volume regions (67; 69) with spring rates different from one another, wherein a softer volume region (67) of the at least two volume regions (67; 69) forms a valve element of the pressure limiting valve (55; 57).

9. The damping valve device as claimed in claim 7, wherein the ring element (35) has an elastic lip (75) which forms the valve body of the pressure limiting valve (55; 57).

* * * * *